United States Patent
Lee et al.

(10) Patent No.: US 11,394,093 B2
(45) Date of Patent: Jul. 19, 2022

(54) SECONDARY BATTERY AND BATTERY MODULE

(71) Applicant: LG Chem, Ltd., Seoul (KR)

(72) Inventors: Han Young Lee, Daejeon (KR); Ji Su Lee, Daejeon (KR)

(73) Assignee: LG Energy Solution, Ltd.

( * ) Notice: Subject to any disclaimer, the term of this patent is extended or adjusted under 35 U.S.C. 154(b) by 15 days.

(21) Appl. No.: 16/979,355

(22) PCT Filed: Dec. 6, 2019

(86) PCT No.: PCT/KR2019/017184
§ 371 (c)(1),
(2) Date: Sep. 9, 2020

(87) PCT Pub. No.: WO2020/166802
PCT Pub. Date: Aug. 20, 2020

(65) Prior Publication Data
US 2021/0005872 A1    Jan. 7, 2021

(30) Foreign Application Priority Data

Feb. 14, 2019    (KR) .......................... 10-2019-0017330

(51) Int. Cl.
*H01M 50/581* (2021.01)
*H01M 50/531* (2021.01)
(Continued)

(52) U.S. Cl.
CPC ....... *H01M 50/581* (2021.01); *H01M 50/116* (2021.01); *H01M 50/20* (2021.01);
(Continued)

(58) Field of Classification Search
CPC .. H01M 50/581; H01M 50/586; H01M 50/00; H01M 2200/00; H01M 50/105; Y02E 60/10; Y02P 70/50; Y02T 10/70
See application file for complete search history.

(56) References Cited

U.S. PATENT DOCUMENTS

| | | | |
|---|---|---|---|
| 8,492,014 B2 | 7/2013 | Kim | |
| 10,651,441 B2 * | 5/2020 | Lim | ..................... H01M 50/20 |

(Continued)

FOREIGN PATENT DOCUMENTS

| | | |
|---|---|---|
| JP | 2001283828 A | 10/2001 |
| JP | 2011040368 A | 2/2011 |

(Continued)

OTHER PUBLICATIONS

Machine translation of KR20060039955A (Year: 2006).*
International Search Report for PCT/KR2019/017184 dated Mar. 16, 2020; 2 pages.

*Primary Examiner* — Allison Bourke
*Assistant Examiner* — Jason Barton
(74) *Attorney, Agent, or Firm* — Lerner, David, Littenberg, Krumholz & Mentlik, LLP (57) ABSTRACT

A secondary battery includes an electrode assembly formed by alternately stacking an electrode and a separator; a battery case that accommodates the electrode assembly therein; a plurality of electrode tabs protruding from the electrode assembly; a plurality of electrode leads, each of which has one end connected to one of the plurality of electrode tabs and another end protruding to an outside of the battery case; and a short-circuit induction part which has a wire shape, wherein ends of the short-circuit induction part are respectively disposed on a sealing part of the battery case that seals the plurality of electrode leads in the battery case, and wherein the ends of the short-circuit induction part are configured to respectively extend toward the plurality of electrode leads to contact the plurality of electrode leads when reaching a specific temperature.

12 Claims, 8 Drawing Sheets

(51) Int. Cl.
  *H01M 50/543* (2021.01)
  *H01M 50/20* (2021.01)
  *H01M 50/116* (2021.01)

(52) U.S. Cl.
  CPC ....... *H01M 50/531* (2021.01); *H01M 50/543* (2021.01); *H01M 2200/00* (2013.01)

(56) References Cited

U.S. PATENT DOCUMENTS

| | | |
|---|---|---|
| 2008/0292962 A1 | 11/2008 | Jung |
| 2011/0039147 A1 | 2/2011 | Cheon et al. |
| 2015/0064517 A1 | 3/2015 | Han et al. |
| 2018/0062151 A1 | 3/2018 | Kim |

FOREIGN PATENT DOCUMENTS

| | | | | |
|---|---|---|---|---|
| JP | 2016110940 A | 6/2016 | | |
| KR | 20060039955 A | 5/2006 | | |
| KR | 20080102606 A | 11/2008 | | |
| KR | 20120082143 A | 7/2012 | | |
| KR | 20140087773 A | 7/2014 | | |
| KR | 20150026010 A | 3/2015 | | |
| KR | 20150045241 A | 4/2015 | | |
| KR | 20160129763 A | 11/2016 | | |
| KR | 20170139305 A | 12/2017 | | |
| KR | 20180018050 A | 2/2018 | | |
| KR | 20190006643 A | 1/2019 | | |
| WO | WO-2012165846 A2 * | 12/2012 | .......... | H01M 50/579 |
| WO | WO-2017073905 A1 * | 5/2017 | .......... | H01M 10/052 |

* cited by examiner

SECONDARY BATTERY AND BATTERY MODULE

CROSS-REFERENCE TO RELATED APPLICATION

The present application is a national phase entry under 35 U.S.C. § 371 of International Application No. PCT/KR2019/017184, filed Dec. 6, 2019, which claims the benefit of the priority of Korean Patent Application No. 10-2019-0017330, filed on Feb. 14, 2019, which are hereby incorporated by reference in their entireties.

TECHNICAL FIELD

The present invention relates to a secondary battery and a battery module, and more particularly, to a secondary battery, in which short circuit between electrode leads is induced to prevent explosion due to the internal short circuit and secure stability when an abnormal operation occurs, and a battery module.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture an electrode assembly, a cathode, a separator, and an anode are manufactured and stacked. Specifically, cathode active material slurry is applied to a cathode collector, and anode active material slurry is applied to an anode collector to manufacture a cathode and an anode. Also, when the separator is interposed and stacked between the manufactured cathode and anode, unit cells are formed. The unit cells are stacked on each other to form an electrode assembly. Also, when the electrode assembly is accommodated in a specific case, and an electrolyte is injected, the secondary battery is manufactured.

In the related art, when the secondary battery abnormally operates such as being exposed to a high temperature or excessively charged or discharged, the separator is contracted due to generated heat, and thus, the cathode and the anode directly contact each other to increase in possibility of the short circuit. Due to the short circuit, rapid electron transfer may occur inside the battery, and thus, when the heat generation and side reactions occur, the secondary battery may be exploded to cause a safety problem. In particular, when an electrical malfunction occurs, such as the overcharge, the overdischarge, or the external short circuit, since high current flows, and the thermal conductivity of the collector is low, the temperature of the collector is higher than that of the active material layer. Thereafter, the heat may be diffused, and thus, thermal, chemical, and electrochemical reactions of components such as the active materials and the electrolytes may be added to lead to thermal runaway.

DISCLOSURE OF THE INVENTION

Technical Problem

An object of the present invention is to provide a secondary battery, in which short circuit between electrode leads is induced to prevent explosion due to the internal short circuit and secure stability when an abnormal operation occurs, and a battery module.

The objects of the present invention are not limited to the aforementioned object, but other objects not described herein will be clearly understood by those skilled in the art from descriptions below.

Technical Solution

A secondary battery according to an embodiment of the present invention for solving the above problems includes: an electrode assembly formed by alternately stacking an electrode and a separator; a battery case that accommodates the electrode assembly therein; a plurality of electrode tabs protruding from the electrode assembly; a plurality of electrode leads, each of which has one end connected to one of the plurality of electrode tabs and another end protruding to an outside of the battery case; and a short-circuit induction part which has a wire shape, wherein ends of the short-circuit induction part are respectively disposed on a sealing part of the battery case that seals the plurality of electrode leads in the battery case, and wherein the ends of the short-circuit induction part are configured to respectively extend toward the plurality of electrode leads to contact the plurality of electrode leads when reaching a specific temperature.

Also, the short-circuit induction part may be made of a shape memory alloy.

Also, the short-circuit induction part may be formed in contact with the sealing part of the battery case.

Also, when the plurality of electrode leads are formed in an opposite direction of the electrode assembly, the short-circuit induction part may be formed in contact with a portion of the sealing part formed along a peripheral edge in the battery case.

Also, the short-circuit induction part may be formed along an outer surface of a cup part of the battery case that accommodates the electrode assembly.

Also, when reaching the specific temperature, both the ends of the short-circuit induction part may be configured to be separated from the sealing part to extend and to be bent toward the electrode leads, respectively.

A battery module according to an embodiment of the present invention for solving the above problems includes: a secondary battery comprising an electrode assembly formed by alternately stacking an electrode and a separator, a battery case that accommodates the electrode assembly therein, a plurality of electrode tabs protruding from the electrode assembly, a plurality of electrode leads, each of which has one end connected to one of the plurality of electrode tabs and another end protruding to an outside of the battery case, and a short-circuit induction part, wherein ends of the short-circuit induction part are respectively disposed on a sealing part of the battery case that seals the plurality of electrode leads in the battery case, wherein the ends of the short-circuit induction part are configured to respectively extend toward the plurality of electrode leads to contact the plurality of electrode leads when reaching a specific temperature; and a housing accommodating the secondary battery therein.

Also, the short-circuit induction part may be made of a shape memory alloy.

Also, the short-circuit induction part may be formed in contact with an edge of an inner space of the housing.

Also, when reaching the specific temperature, both the ends of the short-circuit induction part may be configured to be separated from the sealing part to extend and to be bent toward the electrode leads, respectively.

Also, the present invention may provide a battery pack including the battery module and provide a device including the battery pack.

The device may include a computer, a notebook, a smart phone, a mobile phone, a tablet PC, a wearable electronic device, a power tool, an electric vehicle (EV), a hybrid electric vehicle (HEV), a plug-in hybrid electric vehicle (PHEV), or a power storage device, but is not limited thereto.

The structures of the battery pack and the device and the method for manufacturing them are well known in the art, and thus their detailed descriptions will be omitted herein.

Particularities of other embodiments are included in the detailed description and drawings.

Advantageous Effects

The embodiments of the present invention may have at least the following effects.

In the abnormal operation, the internal temperature may increase so that both ends of the short-circuit induction part may respectively contact the electrode leads to induce the short circuit between the electrode leads, thereby preventing the explosion due to the internal short circuit and ensuring the stability.

The effects of the prevent invention are not limited by the aforementioned description, and thus, more varied effects are involved in this specification.

MODE FOR CARRYING OUT THE INVENTION

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art.

Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 1:
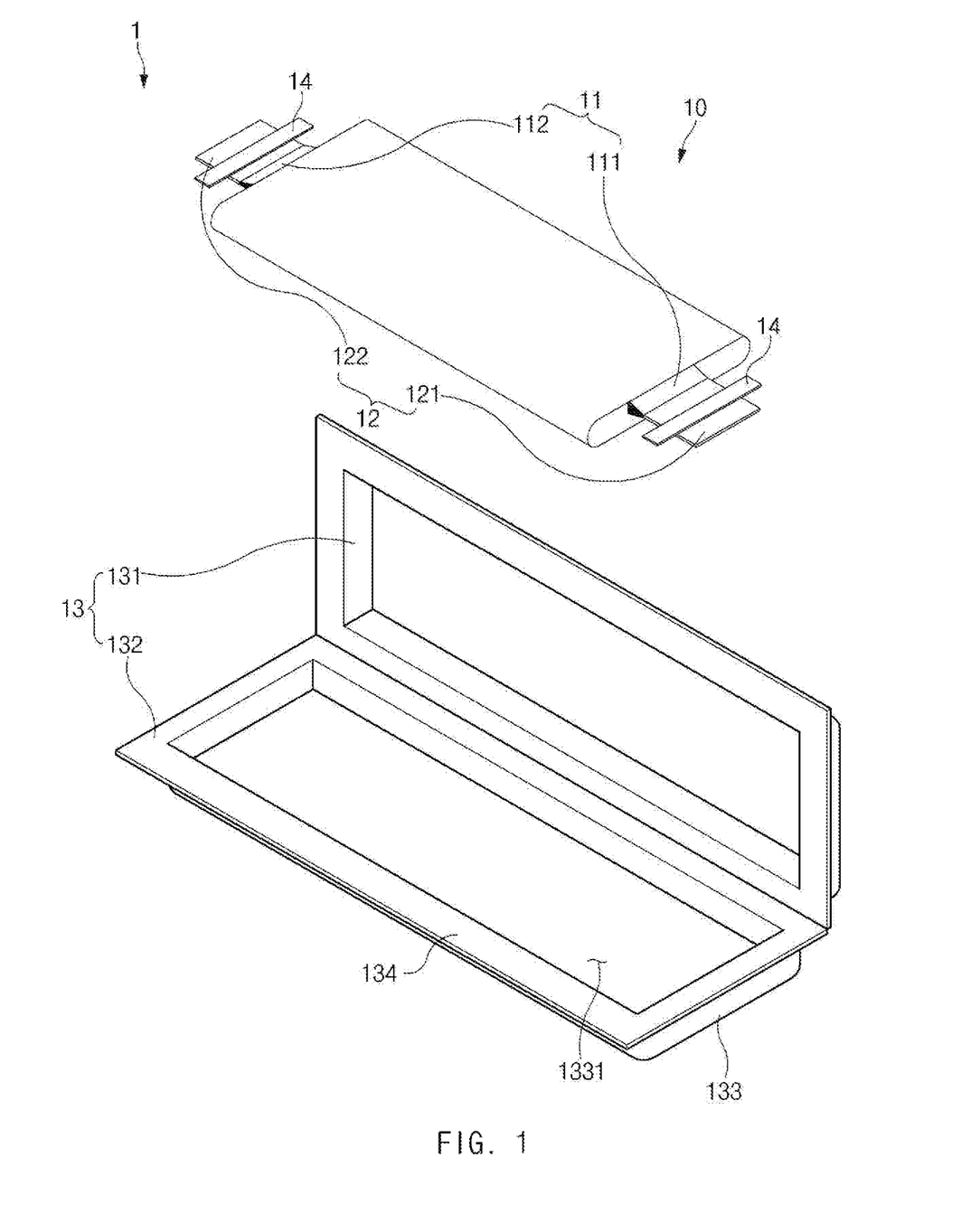
FIG. 1 is an assembly view of a secondary battery according to an embodiment of the present invention.
Figure 2:
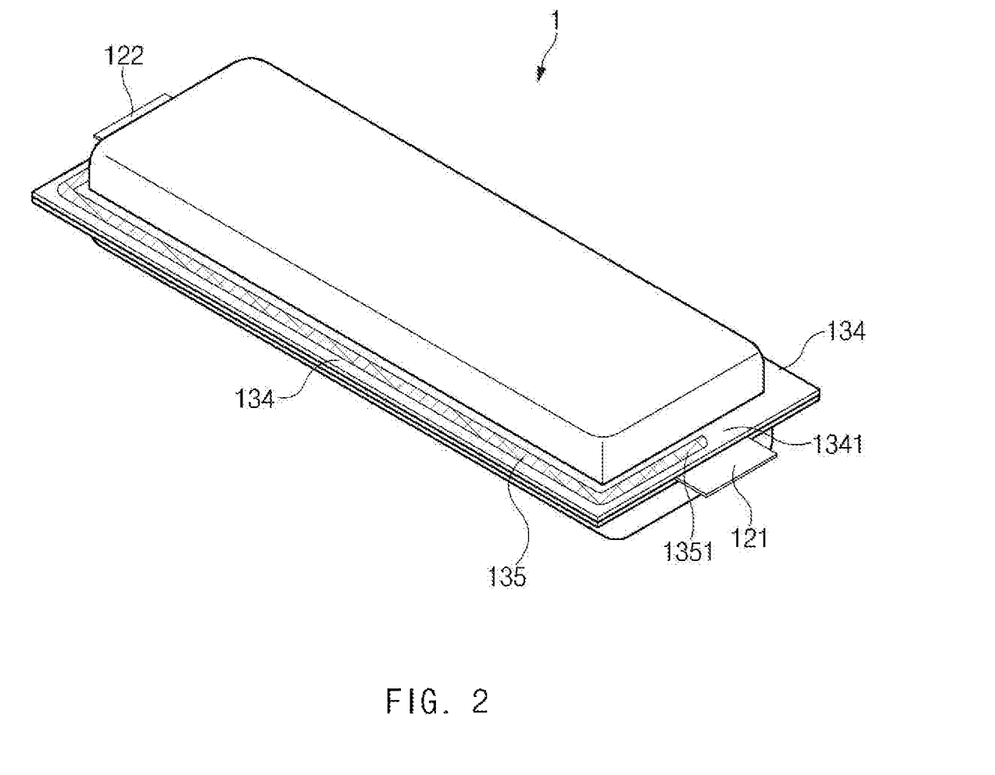
FIG. 2 is a perspective view of the secondary battery according to an embodiment of the present invention.

FIG. 1 is an assembly view of a secondary battery 1 according to an embodiment of the present invention, and FIG. 2 is a perspective view of the secondary battery 1 according to an embodiment of the present invention.

According to an embodiment of the present invention, in an abnormal operation, an internal temperature may increase so that both ends 1351 of a short-circuit induction part 135 respectively contact electrode leads 12 to induce short circuit between the electrode leads 12, thereby preventing explosion due to the internal short circuit and secure stability.

For this, the secondary battery 1 according to an embodiment of the present invention includes: an electrode assembly 10 formed by alternately stacking an electrode and a separator; a battery case 13 that accommodates the electrode assembly 10 therein; a plurality of electrode tabs 11 protruding from the electrode assembly 10 to one side; a plurality of electrode leads 12, each of which has one end connected to the electrode tab 11 and the other end protruding to the outside of the battery case 13; and a short-circuit induction part 135 of which both ends 1351 are respectively disposed on a sealing part 1341 that seals the electrode leads 12 in the battery case 13 and of which both the ends 1351 respectively extend toward the electrode leads 12 to contact the electrode leads 12 when reaching a specific temperature.

The electrode assembly 10 is formed by alternately stacking the electrode and the separator. First, slurry in which an electrode active material, a binder, and a plasticizer are mixed with each other is applied to a cathode collector and an anode collector to manufacture a cathode and an anode. Thereafter, the cathode and the anode are respectively stacked on both sides of the separator to form an electrode assembly 10 having a predetermined shape. Then, the electrode assembly is inserted into the battery case 13, an electrolyte is injected into the battery case 13, and a sealing process is performed.

Specifically, the electrode assembly 10 includes two types of electrodes, such as the cathode and the anode, and the separator interposed between the electrodes to insulate the electrodes from each other. The electrode assembly 10 may be a stack type, a jelly roll type, a stacked and folding type, or the like. Each of the two types of electrodes, i.e., the cathode and the anode has a structure in which active material slurry is applied to the electrode collector having a metal foil or metal mesh shape. The slurry may be usually formed by agitating a granular active material, an auxiliary conductor, a binder, and a plasticizer with a solvent added. The solvent may be removed in the subsequent process.

As illustrated in FIG. 1, the electrode assembly 10 includes the electrode tabs 11. The electrode tabs 11 are respectively connected to the cathode and the anode of the electrode assembly 10 to protrude outward from one side of the electrode assembly 10, thereby providing a path, through which electrons move, between the inside and outside of the electrode assembly 10. A collector of the electrode assembly 10 is constituted by a portion coated with an electrode active material and a distal end, on which the electrode active material is not applied, i.e., a non-coating portion. Also, each of the electrode tabs 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in directions different from each other, but the present invention is not limited thereto. For example, the electrode tabs 11 may protrude in the same direction.

In the electrode assembly 10, the electrode lead 12 is connected to the electrode tab 11 through spot welding. Also, a portion of the electrode lead 12 is surrounded by an insulation part 14. The insulation part 14 may be disposed to be limited within a sealing part 134, at which an upper case 131 and a lower case 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

One end of the electrode lead 12 is connected to the electrode tab 11, and the other end of the electrode lead 12 protrudes to the outside of the battery case 13. That is, the electrode lead 12 includes a cathode lead 121 having one end connected to a cathode tab 111 to extend in a direction in which the cathode tab 111 protrudes and an anode lead 122 having one end connected to an anode tab 112 to extend in a direction in which the anode tab 112 protrudes. On the other hand, as illustrated in FIG. 1, all of the other ends of the cathode lead 121 and the anode lead 122 protrude to the outside of the battery case 13. As a result, electricity generated in the electrode assembly 10 may be supplied to the outside. Also, since each of the cathode tab 111 and the anode tab 112 is formed to protrude in various directions, each of the cathode lead 121 and the anode lead 122 may extend in various directions.

The cathode lead 121 and the anode lead 122 may be made of materials different from each other. That is, the cathode lead 121 may be made of the same material as the cathode collector, i.e., an aluminum (Al) material, and the anode lead 122 may be made of the same material as the anode collector, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material. Hereinafter, the case in which the battery case 13 is the pouch will be described. The battery case 13 accommodates the electrode assembly 10 so that a portion of the electrode lead 12, i.e., the terminal part is exposed and then is sealed. As illustrated in FIG. 1, the battery case 13 includes the upper case 131 and the lower case 132. An accommodation space 1331 in which a cup part 133 is formed to accommodate the electrode assembly 10 may be provided in the lower case 132, and upper case 131 may cover an upper side of the accommodation space 1331 so that the electrode assembly 10 is not separated to the outside of the battery case 13. Here, as illustrated in FIG. 1, the cup part 133 having the accommodation space 1331 may be formed in the upper case 131 to accommodate the electrode assembly 10 in the upper portion. As illustrated in FIG. 1, one side of the upper case 131 and one side of the lower case 132 may be connected to each other. However, the present invention is not limited thereto. For example, the upper case 131 and the lower case may be separately manufactured to be separated from each other.

Both ends of the short-circuit induction part 135 are disposed on a sealing part 1321 that seals the electrode leads 12 in the battery case 13. When reaching a specific temperature, both the ends 1351 extend toward the electrode leads 12 to contact the electrode leads 12, respectively. The short-circuit induction part 135 will be described below in detail.

When an electrode lead 12 is connected to the electrode tab 11 of the electrode assembly 10, and the insulation part 14 is provided on a portion of the electrode lead 12, the electrode assembly 10 may be accommodated in the accommodation space 1331 provided in the cup part 133 of the lower case 132, and the upper case 131 may cover an upper portion of the accommodation space. Also, the electrolyte is injected, and the sealing part 134 formed on edges of the upper case 131 and the lower case 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. As illustrated in FIG. 2, the pouch type secondary battery 1 may be manufactured through the above-described method.

Figure 3:
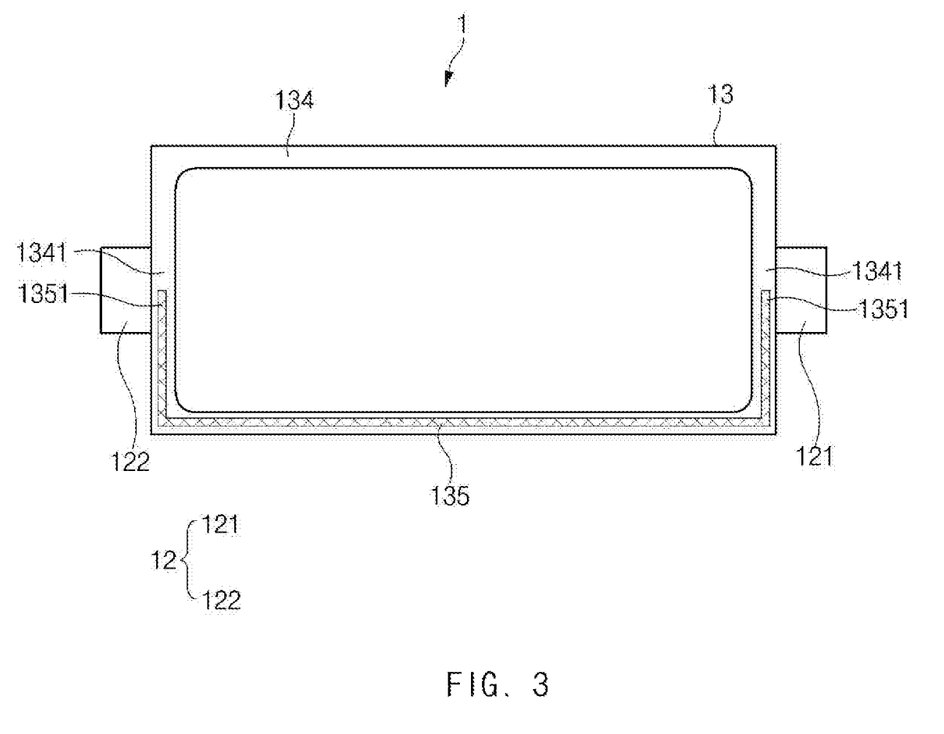
FIG. 3 is plan view of the secondary battery according to an embodiment of the present invention.
Figure 4:
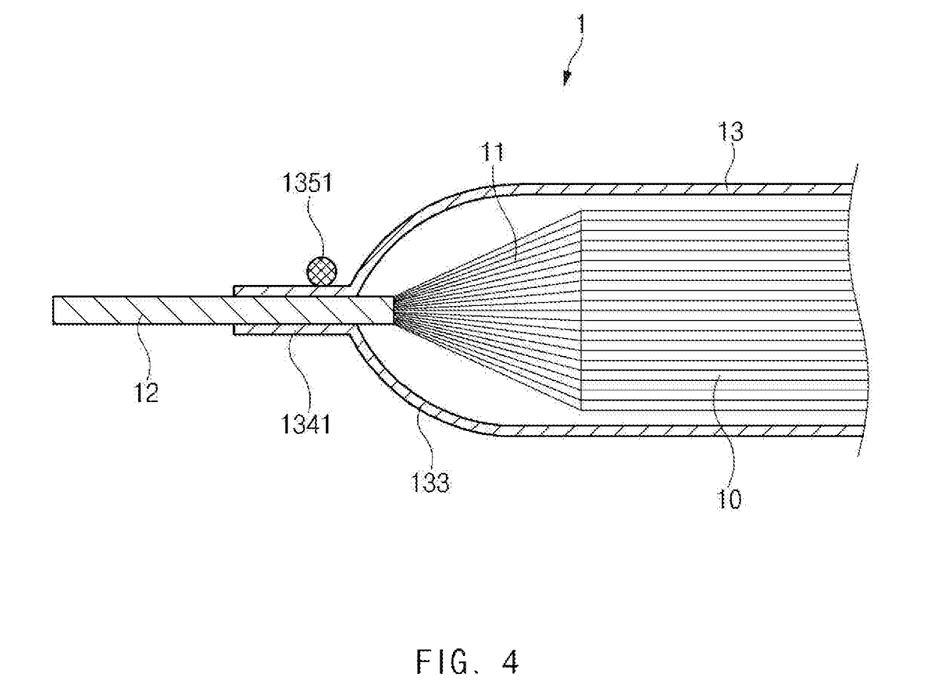
FIG. 4 is an enlarged cross-sectional view of the secondary battery according to an embodiment of the present invention.

FIG. 3 is plan view of the secondary battery according to an embodiment of the present invention, and FIG. 4 is an enlarged cross-sectional view of the secondary battery according to an embodiment of the present invention.

As illustrated in FIG. 3, the secondary battery 1 according to an embodiment of the present invention includes the short-circuit induction part 135. The short-circuit induction part 135 may have a thin and long wire shape, and when the temperature is changed, the shape may be also changed. In particular, according to an embodiment of the present invention, the short-circuit induction part 135 may be made of a shape memory alloy.

The shape memory alloy is an alloy that remembers an original shape and returns to its original shape even if it is deformed by heat or a pressure. When a general metal is deformed, bonding within the metal is released or newly formed, but the shape memory alloy is retained even when the bonding within the metal is deformed and returns to its original shape while the deformation is released under certain conditions. Typical shape memory alloys include nitinol that is an alloy of nickel (Ni) and titanium (Ti).

The short-circuit induction part 135 may be in close contact with the sealing part 134 of the battery case 13. As a result, the short-circuit induction part 135 may be prevented from being damaged by external friction without largely changing a size and shape of the secondary battery 1. If the plurality of electrode leads 12 are formed in an opposite direction of the electrode assembly 10, as illustrated in FIG. 3, the short-circuit induction part 135 may be in close contact with a portion of the sealing part 134 formed along the peripheral edge of the battery case 13. However, the present invention is not limited thereto, and the short-circuit induction part 135 may be formed along an outer surface of the cup part 133 accommodating the electrode assembly 10 in the battery case 13. As a result, the short-circuit induction part 135 may be formed along the shortest path between the plurality of electrode leads 12 to minimize a length of the short-circuit induction part 135, thereby securing economical efficiency.

However, if the plurality of electrode leads 12 are formed in the same direction of the electrode assembly 10, the short-circuit induction part 135 may be in close contact with a portion of the sealing part 134 formed between the plurality of electrode leads 12 in the battery case 13. That is, the short-circuit induction part 135 is not limited thereto and may be formed in close contact with the battery case 13 in various manners.

As illustrated in FIG. 4, both the ends 1351 of the short-circuit induction part 135 are disposed on the sealing part 1341 which seals the electrode leads 12 in the battery case 13. As a result, the short-circuit induction part 135 may be disposed to be closest to the electrode leads 12, and thereafter, when both the ends 1351 of the short-circuit induction part 135 extend toward the electrode leads 12, the short-circuit induction part 135 may easily contact the electrode leads 12.

Figure 5:
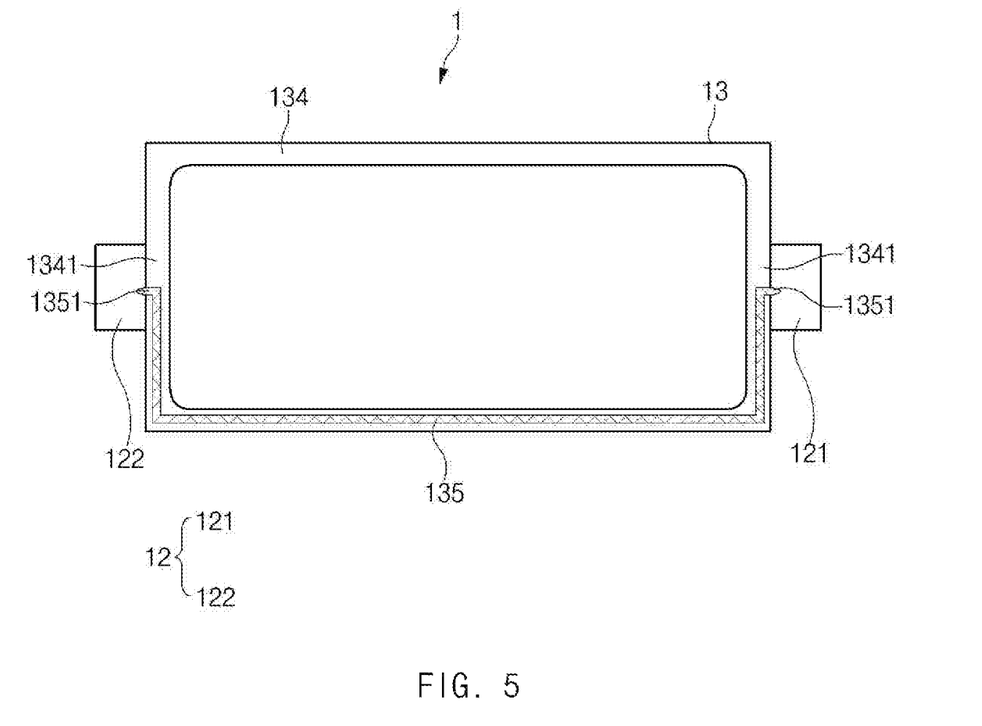
FIG. 5 is a plan view of the secondary battery when both ends of a short-circuit induction part extend according to an embodiment of the present invention.
Figure 6:
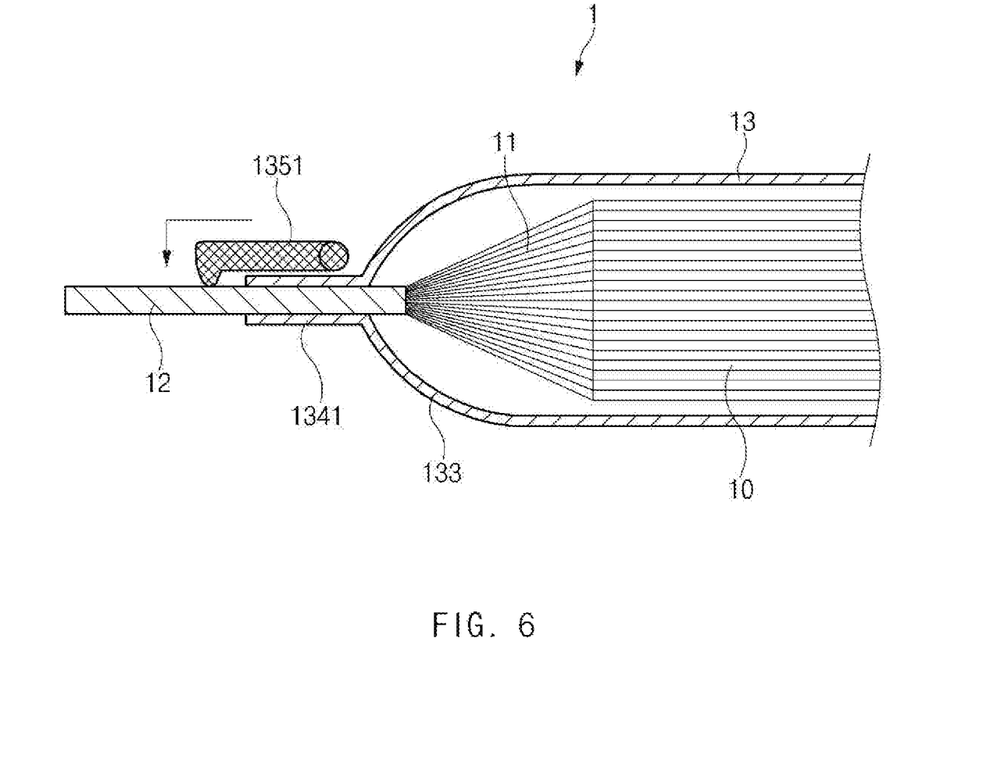
FIG. 6 is an enlarged cross-sectional view of the secondary battery when both the ends of the short-circuit induction part extend according to an embodiment of the present invention.

FIG. 5 is a plan view of the secondary battery 1 when both the ends 1351 of the short-circuit induction part 135 extend according to an embodiment of the present invention, and FIG. 6 is an enlarged cross-sectional view of the secondary battery 1 when both the ends 1351 of the short-circuit induction part 135 extend according to an embodiment of the present invention.

When the short-circuit induction part 135 is changed in temperature, its shape may also be changed. That is, the short-circuit induction part 135 does not contact the electrode leads 12 at room temperature, but when the temperature increases to reach a specific temperature, the shape of the short-circuit induction part 135 is changed to contact each of the electrode leads 12. In particular, both the ends 1351 of the short-circuiting induction part 135 extend toward the electrode leads 12 to contact the electrode leads 12, respectively, as illustrated in FIG. 5.

The short-circuit induction part 135 is made of a conductive material. Therefore, when both the ends 1351 of the short-circuit induction part 135 contact the electrode leads 12, respectively, the short circuit occurs between the electrode leads 12. As a result, even if the short circuit occurs inside the secondary battery 1, large explosion may be prevented to secure the stability.

Both the ends 1351 of the short-circuit induction part 135 extend toward the electrode leads 12 to contact the electrode leads 12, respectively. In this case, the electrode lead 12 may have a stepped portion somewhat with respect to the sealing part 134. Thus, as illustrated in FIG. 6, both the ends 1351 of the short-circuit induction part 135 are separated from the sealing part 134 to extend and then are bent toward the electrode leads 12 to contact the electrode leads 12, respectively. However, the present invention is not limited thereto, and if both the ends 1351 are separated from the sealing part 134 to gradually extend, both the ends 1351 may droop due to gravity to contact the electrode leads 12, respectively.

Figure 7:
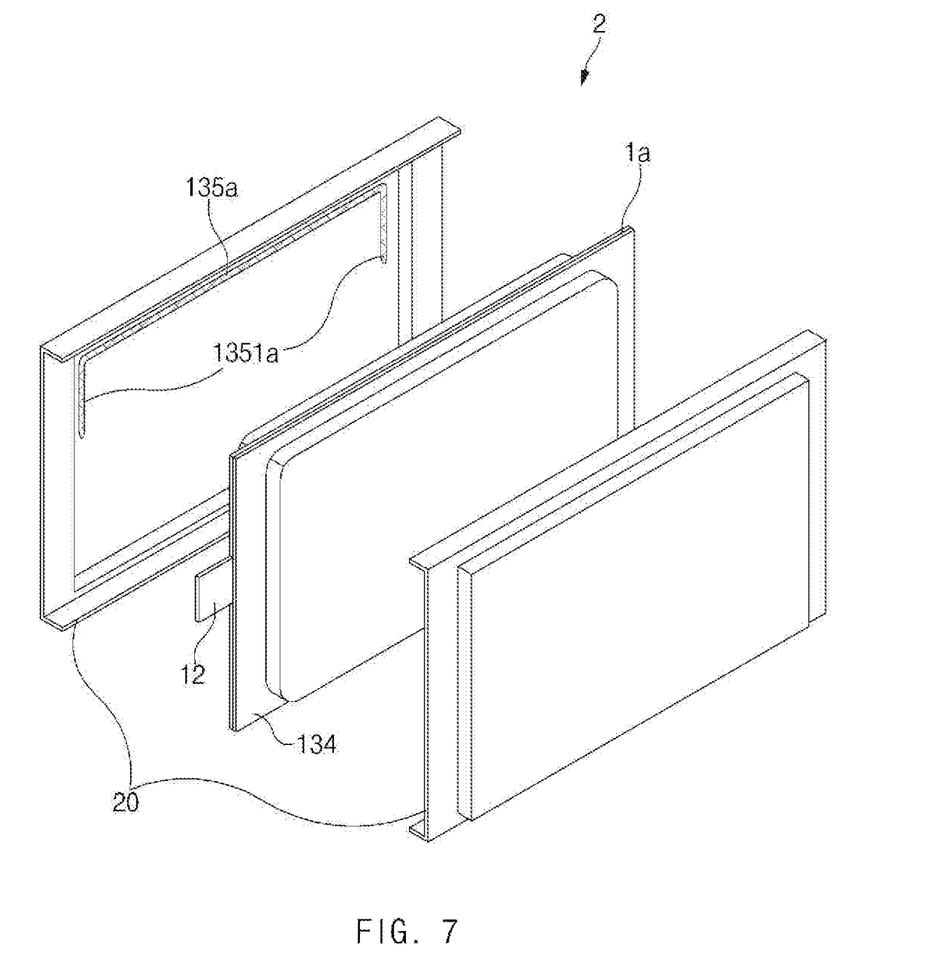
FIG. 7 is an assembly view of a battery module according to another embodiment of the present invention.

FIG. 7 is an assembly view of a battery module 2 according to another embodiment of the present invention.

According to an embodiment of the present invention, the short-circuit induction part 135 is formed in close contact with the sealing part 134 of the battery case 13. As a result, the short-circuit induction part 135 may be prevented from being damaged by external friction without largely changing a size and shape of the secondary battery 1.

However, according to another embodiment of the present invention, when a secondary battery 1a is assembled to form a battery module 2, the short-circuit induction part 135a may not be formed in the battery case 13 but be formed in the housing 20 of the battery module 2. As a result, it may be easy to fix the short-circuit induction part 135a to the housing having rigidity rather than the pouch type battery case 13 having flexibility.

The battery module 2 according to another embodiment of the present invention includes: a secondary battery 1a including an electrode assembly 10 formed by alternately stacking an electrode and a separator, a battery case 13 that accommodates the electrode assembly 10 therein, a plurality of electrode tabs 11 protruding from the electrode assembly 10 to one side, a plurality of electrode leads 12, each of which has one end connected to the electrode tab 11 and the other end protruding to the outside of the battery case 13, and a short-circuit induction part 135a of which both ends 1351a are respectively disposed on a sealing part 1341 that seals the electrode leads 12 in the battery case 13 and of which both the ends 1351a respectively extend toward the electrode leads 12 to contact the electrode leads 12 when reaching a specific temperature; and a housing 20 accommodating the secondary battery 1a therein.

The housing 20 accommodates the secondary battery 1a therein, and as illustrated in FIG. 7, upper and lower housings 20 are coupled to each other at both sides of the secondary battery 1a to accommodate the secondary battery 1a. The housing 20 may accommodate only one secondary battery 1a therein, but is not limited thereto. For example, the housing 20 may accommodate a plurality of secondary batteries 1.

The short-circuit induction part 135a according to another embodiment of the present invention is formed in the housing 20 of the battery module 2. In particular, if the plurality of electrode leads 12 are formed in the opposite direction to each other, the short-circuit induction part 135a may be in close contact along an edge of an inner space of the housing 20. Also, both the ends 1351a of the short-circuit induction part 135a are disposed on the sealing part 1341 that seals the electrode leads 12. As a result, the short-circuit induction part 135a may be disposed to be closest to the electrode leads 12, and thereafter, when both the ends 1351a of the short-circuit induction part 135a extend toward the electrode leads 12, the short-circuit induction part 135a may easily contact the electrode leads 12.

Figure 8:
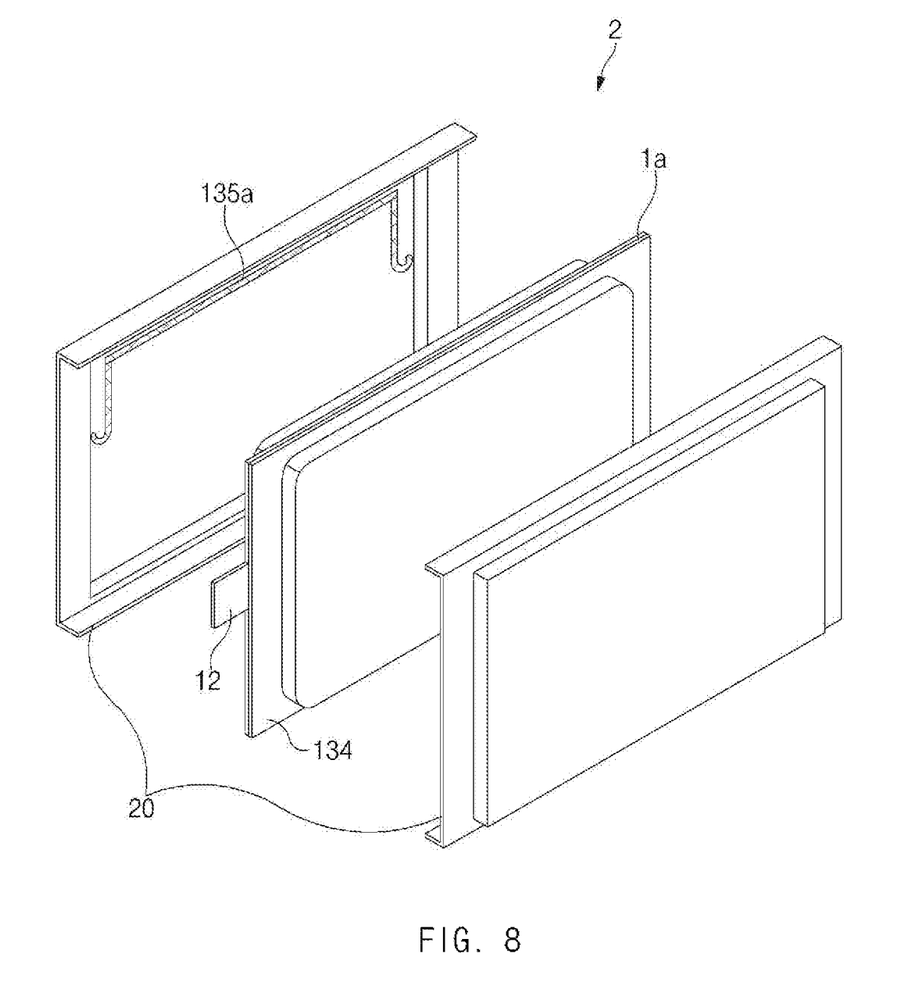
FIG. 8 is a plan view of the battery module when both ends of a short-circuit induction part extend according to another embodiment of the present invention.

FIG. 8 is a plan view of the battery module 2 when both the ends 1351a of the short-circuit induction part 135a extend according to another embodiment of the present invention.

When the short-circuit induction part 153a increases in temperature to reach a specific temperature, as illustrated in FIG. 8, both the ends 1351a of the short-circuit induction part 135a extend toward the electrode leads 12 to contact the electrode leads, respectively. Here, both the ends 1351a of the short-circuit induction part 135a are separated from the sealing part 134 to extend and then are bent toward the electrode leads 12 to contact the electrode leads 12, respectively. However, the present invention is not limited thereto, and if both the ends 1351a are separated from the sealing part 134 to gradually extend, both the ends 1351a may droop due to gravity to contact the electrode leads 12, respectively.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising:
an electrode assembly formed by alternately stacking an electrode and a separator;
a battery case that accommodates the electrode assembly therein;
a plurality of electrode tabs protruding from the electrode assembly;
a plurality of electrode leads, each of which has one end connected to one of the plurality of electrode tabs and another end protruding to an outside of the battery case; and
a short-circuit induction part which is a wire,
wherein a first end and a second end of the short-circuit induction part are respectively disposed on a sealing part of the battery case that seals the plurality of electrode leads in the battery case, and
wherein the first and second ends of the short-circuit induction part are configured to not contact the plurality of electrode leads when the short-circuit induction part is below a specific temperature, and are configured to respectively extend toward the plurality of electrode leads to contact the plurality of electrode leads when the short-circuit induction part exceeds the specific temperature.

2. The secondary battery of claim 1, wherein the short-circuit induction part is made of a shape memory alloy.

3. The secondary battery of claim 1, wherein the wire is formed in contact with the sealing part of the battery case.

4. The secondary battery of claim 3, wherein, when the plurality of electrode leads comprises only two electrode leads formed at opposite ends of the electrode assembly, the short-circuit induction part is formed in contact with a portion of the sealing part formed along a peripheral edge in the battery case.

5. The secondary battery of claim 1, wherein the short-circuit induction part is formed along an outer surface of a cup part of the battery case that accommodates the electrode assembly.

6. The secondary battery of claim 1, wherein when reaching the specific temperature, both the first and second ends of the short-circuit induction part are configured to be separated from the sealing part to extend and to be bent toward the electrode leads, respectively.

7. A battery module comprising:
a secondary battery comprising an electrode assembly formed by alternately stacking an electrode and a separator, a battery case that accommodates the electrode assembly therein, a plurality of electrode tabs protruding from the electrode assembly, a plurality of electrode leads, each of which has one end connected to one of the plurality of electrode tabs and another end protruding to an outside of the battery case, and a short-circuit induction part, wherein a first end and a second ends of the short-circuit induction part are respectively disposed on a sealing part of the battery case that seals the plurality of electrode leads in the battery case, wherein the first and second ends of the short-circuit induction part are configured to not contact the plurality of electrode leads when the short-circuit induction part is below a specific temperature, and are configured to respectively extend toward the plurality of electrode leads to contact the plurality of electrode leads when the short-circuit induction part exceeds the specific temperature; and
a housing accommodating the secondary battery therein.

8. The battery module of claim 7, wherein the short-circuit induction part is made of a shape memory alloy.

9. The battery module of claim 7, wherein the short-circuit induction part is a wire formed in contact with an edge of an inner space of the housing.

10. The battery module of claim 7, wherein when reaching the specific temperature, both the first and second ends of the short-circuit induction part are configured to be separated from the sealing part to extend and to be bent toward the electrode leads, respectively.

11. A battery pack comprising the battery module of claim 7.

12. A device comprising the battery pack of claim 11.

* * * * *